United States Patent [19]

Fellinger

[11] Patent Number: 5,202,762
[45] Date of Patent: Apr. 13, 1993

[54] METHOD AND APPARATUS FOR APPLYING CORRECTION TO A SIGNAL USED TO MODULATE A BACKGROUND VIDEO SIGNAL TO BE COMBINED WITH A FOREGROUND VIDEO SIGNAL

[75] Inventor: David F. Fellinger, Westlake Village, Calif.

[73] Assignee: Ultimatte Corporation, Chatsworth, Calif.

[21] Appl. No.: 757,234

[22] Filed: Sep. 10, 1991

[51] Int. Cl.$^5$ ............................................. H04N 5/14
[52] U.S. Cl. ................................... 358/163; 358/183; 358/182; 358/181; 358/178; 358/169
[58] Field of Search .......... 358/183, 182, 181, 22 CK, 358/22, 169, 163, 172, 178

[56] References Cited

U.S. PATENT DOCUMENTS 3,588,338 6/1971 Dischert ............................... 358/163
4,121,253 10/1978 McCoy ................................. 358/182
4,731,652 3/1988 Yamanaka ........................... 358/163

Primary Examiner—James J. Groody
Assistant Examiner—Sherrie Hsia
Attorney, Agent, or Firm—Blakely, Sokoloff, Taylor & Zafman

[57] ABSTRACT

An apparatus and method which control the gain of the key signal dynamically and thereby compensate for the effects of an unevenly lit backing or lens vignetting. This dynamic control occurs over a video frame and has the effect of modulating the key signal. In this connection, there are four possible gain controls as follows: a) a horizontal ramp to increase the level of either side (left or right) of the key signal; b) a vertical ramp to increase the level of the top or bottom of the key signal; c) a horizontal parabola to raise or lower the gain of both sides of the key signal simultaneously to nullify lens effects; and d) a vertical parabola to raise or lower the gain of both the top and bottom of the key signal simultaneously to nullify lens effects.

10 Claims, 2 Drawing Sheets

METHOD AND APPARATUS FOR APPLYING CORRECTION TO A SIGNAL USED TO MODULATE A BACKGROUND VIDEO SIGNAL TO BE COMBINED WITH A FOREGROUND VIDEO SIGNAL

BACKGROUND OF THE INVENTION

Image compositing devices generally mix a foreground subject against a blue or green screen or backing with a background image. The resulting video image is the foreground subject, with the blue or green screen replaced by the background image. Very high quality image compositing devices can reproduce shadows and transparency details such that the background image is linearly "turned on" by a control (key) signal at the exact level to produce a convincing composite. In this manner, shadows cast by the foreground subject on the blue or green backing appear, in the composite, to be cast on the background image. U.S. Pat. No. 4,100,569 discloses such an image compositing device.

However, high quality compositing devices which can reproduce shadows and delicate transparency details can also reproduce common lighting and lens problems. Backing screens are often lit from the top causing the top of the backing to be much brighter than the bottom. An automatic gain control circuit which evaluates the key signal generated from the screen "sees" the top of the screen as fully lit and the remainder of the screen as lower in illumination, in effect, causing the remainder of the screen to be defined as a shadow. The second problem is lens vignetting. Many times it is necessary to use lens polarizers in blue or green screen shooting to prevent glare. This produces a lower light level at the camera tubes and causes the camera operator to open the lens iris to compensate for the lower light level. When the lens is opened, however, the corners of the picture may become darkened which then appears in the composite as a shadow which really does not exist. It is possible to have both of these effects occur without being noticed until a composite is attempted. If the composite is done in post-production utilizing a previously produced foreground tape, there is no simple way to fix any such problems in the foreground tape. If the result must be used in a multiple layer application, each new layer multiplies the effect of the previous layer. If the original corners are only 2% darker than the rest of the screen, they will be 8% darker in the third layer pass. It is possible to increase the overall gain of the key signal to compensate, but the result produces a signal gain that is too high for the correctly lit portions of the screen. This excess gain produces a loss of detail and glowing edges around the subject of interest.

SUMMARY OF THE INVENTION

The present invention is directed to an apparatus and method which control the gain of the key signal dynamically and thereby compensate for the effects of an unevenly lit backing or lens vignetting. This dynamic control occurs over a video frame and has the effect of modulating the key signal. In this connection, there are four possible gain controls as follows:

1. A horizontal ramp to increase the level of either side (left or right) of the key signal.
2. A vertical ramp to increase the level of the top or bottom of the key signal.
3. A horizontal parabola to raise or lower the gain of both sides of the key signal simultaneously to nullify lens effects.
4. A vertical parabola to raise or lower the gain of both the top and bottom of the key signal simultaneously to nullify lens effects.

An example of the use of these controls could be in post-production where a foreground tape was produced with darkened corners and the top brighter than the bottom of the screen. After observing this situation, the operator, while observing a waveform monitor or a picture monitor would apply a first adjustment with the vertical ramp control to cause the center of the top of the screen to be equal with the area around the center of the screen. The corners could then be brightened with the parabola controls. This type of correction would remove most of the common problems which occur in blue or green screen production.

DETAILED DESCRIPTION OF THE INVENTION

Figure 1:
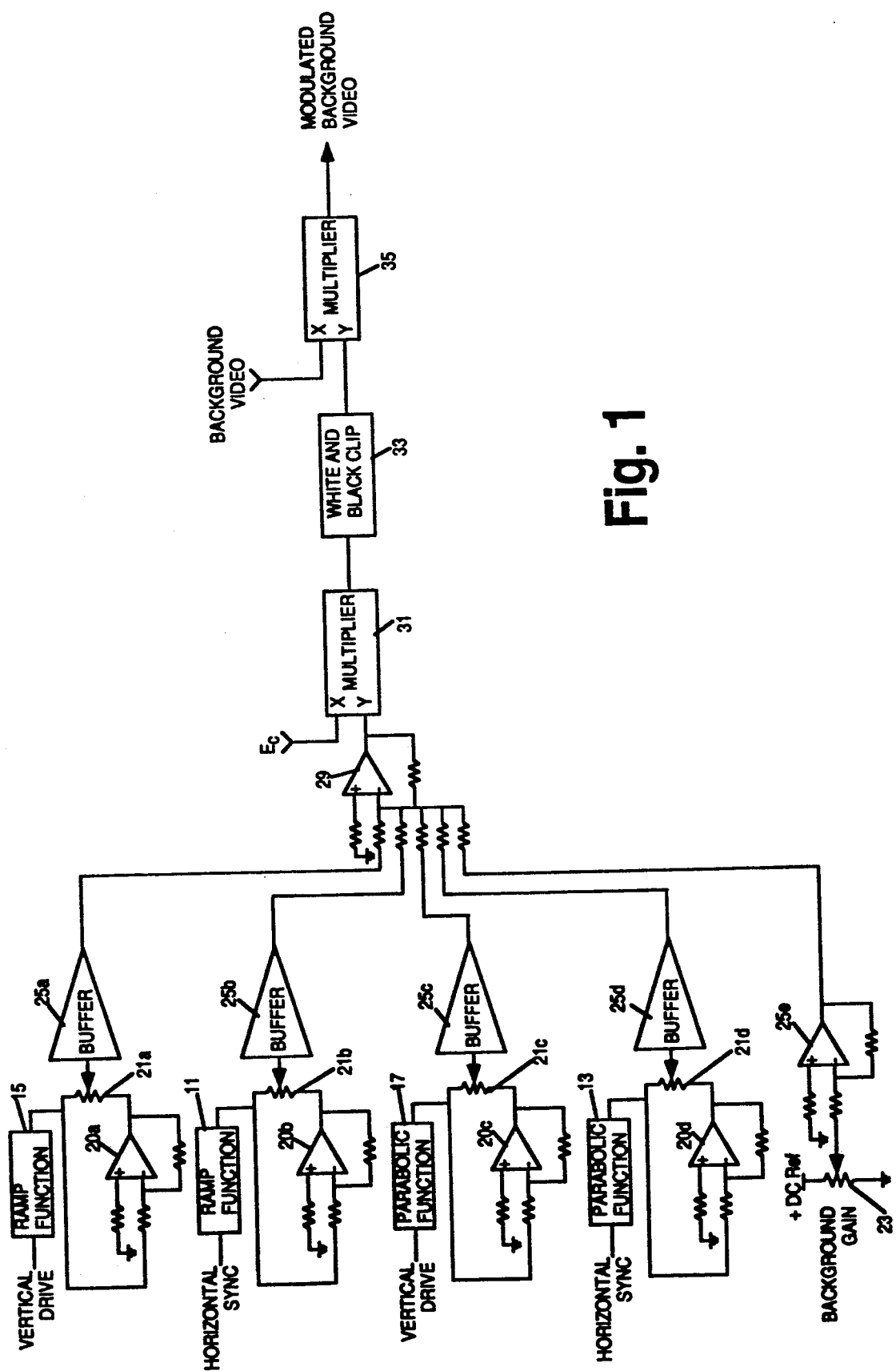
FIG. 1 is a block diagram showing an embodiment of the invention with manual controls.

FIG. 1 is a block diagram of the circuitry necessary to implement a manually controlled embodiment of the invention. A video line synchronized ramp function 11 and parabolic function 13 are derived from horizontal or composite sync according to well known techniques and circuits. A field synchronized ramp function 15 and parabolic function 17 are derived from vertical drive according to well known techniques and circuits. All four of these functions are inverted by inverters 20a-20d and potentiometers 21a-21d are connected to each function and its inverse. If the wiper of a potentiometer 21a-21d is centered, the output will be the exact additive mix of the function and its inverse, or ground. Moving the potentiometer away from center allows the operator to gradually select a function or the inverse. An additional potentiometer 23 is connected to a DC reference voltage to allow an overall gain adjustment. The output of all 5 potentiometers are buffered by buffers 25a-25e and summed in a summing amplifier 29.

The output of amplifier 29 drives a multiplier 31 which modulates the key signal ($E_c$). The DC reference potentiometer (Background Gain) 23 sets the overall gain of the $E_c$ while the function potentiometers 21a-21d modulate this DC reference and consequently provide a waveform modulation to $E_c$.

The final modulated $E_c$ is passed through a white clip and black clip 33 to assure that the modulated $E_c$ cannot exceed the original background video level and is always positive. The $E_c$ is then passed through multiplier 35 to modulate the background which will be added to the foreground to produce the final composite picture.

Implementation details of the various amplifiers, buffers, clip and modulators should be readily apparent to persons skilled in the art.

In an alternate embodiment of the invention, a microprocessor with suitable inputs could be utilized to automatically adjust the four functions as described above. As disclosed in U.S. Pat. No. 4,625,231, the key signal $E_c$ which will modulate the background is peak detected. This key signal represents the blue or green screen area, and has all of the lighting and shadow detail which is represented on the screen. A peak point is detected which represents an area with no shadow and is taken to be the fully illuminated, unobstructed, screen. In U.S. Pat. No. 4,589,013, an automatic circuit gain controls this key signal to place this peak point at a level which will create a tully "turned-on" background in this peak area. Less illuminated screen areas then appear to be shadows in the final composite picture.

To provide additional correction requires additional peak detection. For example, the full screen raster scan could be divided into nine major areas. These areas would be left, center, and right for the top, middle, and bottom. Peaks in these nine areas could be sampled and held for evaluation. A microprocessor with a multiplexer and an analog to digital converter could be utilized to process the information defined by the peaks. Peaks more than 10% or 15% below the highest peak would be disregarded because there could be a shadow or other obstruction blocking this area. If all areas are determined to be within this tolerance, however, it could be assumed that differences in peaks were caused by lens effects or lighting errors. The microprocessor would then begin a rapid trial and error process to apply the ramp and parabolic corrections in order to decrease or eliminate peak differences. If the screen were so obstructed that the adjustments could not be made, the microprocessor could illuminate a signal light and the operator could vary the scene by changing the tape position or by stage direction in a live production. The adjustments made by the microprocessor could, of course, be refined by the operator, but this first pass automatic adjustment would result in a substantial saving of time.

Figure 2:
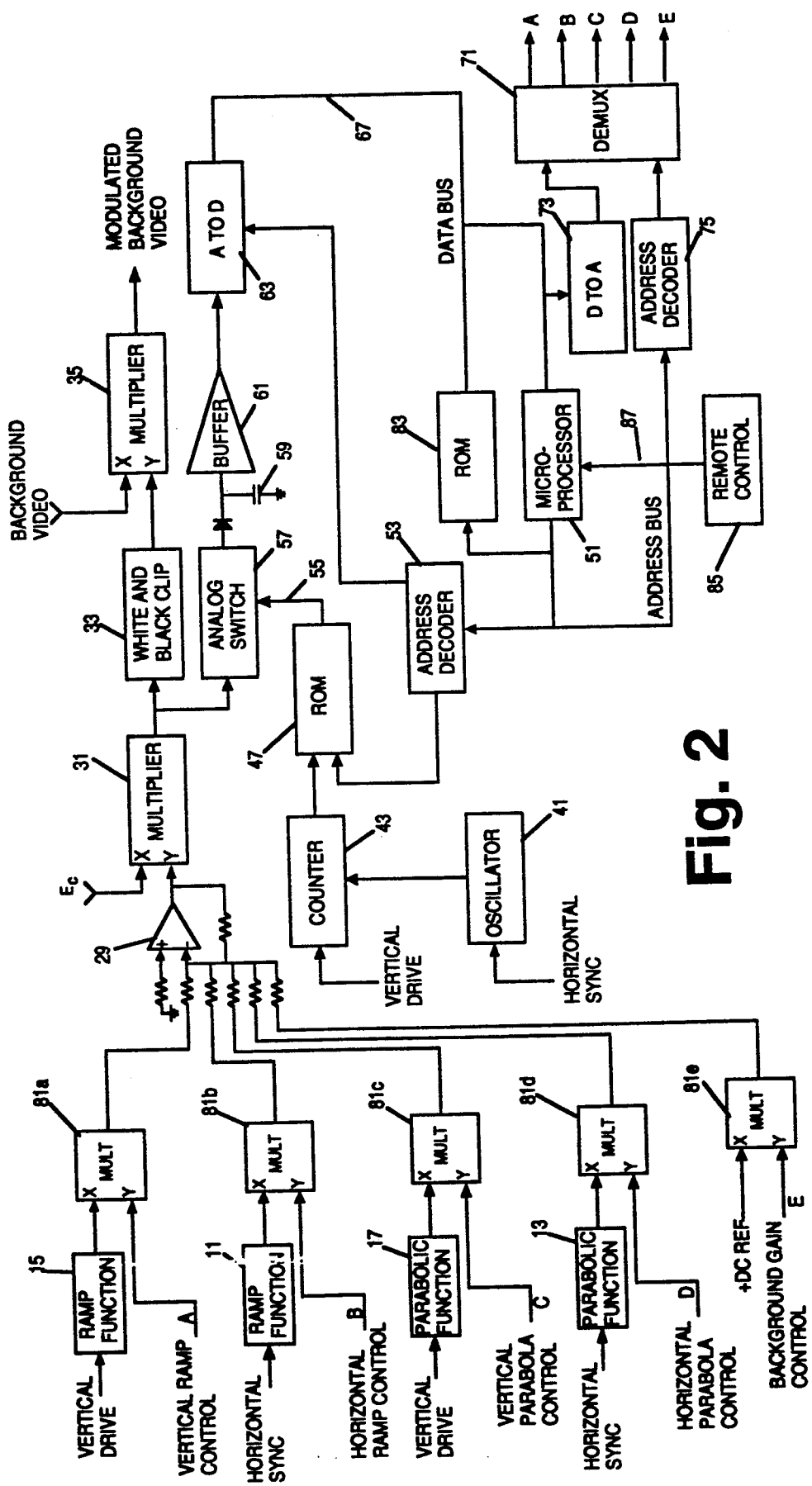
FIG. 2 is a block diagram showing an alternate embodiment of the invention with automated controls.

FIG. 2 is a block diagram of one implementation of an automated adjustment embodiment of the invention. Like numbered components in FIGS. 1 and 2 perform identical functions. As mentioned, the raster is preferably divided into 9 (or more) segments for the purpose of peak detection and analysis. In this case, a phase-locked video rate oscillator 41 is used to drive a counter 43 which is reset by the vertical drive pulse. The oscillator 41 is running at least at three times the video line rate to divide the picture into three horizontal segments. The counter output is a parallel address line into a ROM 47 connected to counter 43. The high order bits of ROM 47 are driven by a microprocessor 51 through an address decoder block 53. ROM 47 is programmed such that data line 55 remains in a high state for the defined screen segments selected by the high order address lines. The ROM may be a small programmable read only memory (PROM) with only an eight bit address bus. The counter is a four bit counter and is connected to the lower bits. The microprocessor addresses the four high bits. The PROM in this configuration operates as a simple address decoder and is programmed as follows. All locations are programmed to zero except for these unique addresses; 11, 22, 33, 44, 55, 66, 77, 88, and 99 which are programmed to 01. If the microprocessor must address zone 4, a 4 is placed on the high order bits of the PROM and when the counter reaches a count of 4, the output bit of the PROM will rise. This same function could be realized with a dual four bit magnitude comparator using the equality pin as an output comparing the inputs from the counter and the microprocessor.

Data line 55 is connected to an analog switch 57 which enables diode peak detection of $E_c$. These peaks are stored in a capacitor 59, buffered by buffer 61, and connected to an analog to digital converter 63 so that the data of the peaks can be placed on the data bus 67 of the microprocessor 51. Microprocessor 51 can then enable A to D converter 63 by addressing it and obtain data on peak $E_c$ in only specific screen segments. After evaluating the data, microprocessor 51 can control the $E_c$ modulation functions (i.e., ramp functions 11 and 15 and parabolic functions 13 and 17) with the digital to analog converter 73 coupled through an addressed demultiplexer 71. The appropriate control voltage is generated by D to A converter 73 based upon data on data bus 67 and the appropriate control voltage (i.e., one of vertical ramp, horizontal ramp, vertical parabola, horizontal parabola or background gain) is selected by address decoder 75. The control voltages so generated are applied to the Y inputs of four quadrant multipliers 81a-81e which are summed by summing amplifier 29, the output of which is the modulation signal applied to the $E_c$ by multiplier 31.

In this embodiment it is not necessary to develop the inverse function as in the manual embodiment shown in FIG. 1, because the necessary inversions can be produced by multipliers 81a-81e. FIG. 2 is a closed loop system in which the microprocessor 51 can make a value change on a control voltage and query the result of that change by addressing specific peaks. Assuming that the raster is divided into 9 major areas the program utilized by microprocessor 51 (which would be stored in ROM 83) could take the following form:

1. Obtain data for the peaks for all 9 areas.
2. Compare this data and notify the operator if the peaks for two areas or more vary from the maximum peak by more than 10%.
3. Calculate the average of the upper left, middle left, and lower left areas and subtract it from the average of the upper right, middle right, and lower right areas.
4. A positive result indicates the need for the application of a negatively slopped horizontal ramp function. A negative result (left side brighter than right side) indicates the need for the application of a positively slopped ramp function.
5. Apply the appropriate function and again repeat the process.
6. Continue adjusting for approximately 20 passes or until the resultant peaks are closer than 1%.
7. Repeat steps 1-6 using the average of the upper left, upper middle, and upper right areas subtracted from the average of the lower left, lower middle, and lower right areas to establish the vertical ramp correction.
8. Determine parabolic profiles in the first pass by comparing the average of all four corners with the center. Both parabolic functions can be initially applied at the same time as a first pass approximation of normal lens vignetting. As a final pass the zones to the right and left of the center can be compared to the center to optimize the horizontal parabolic correction. The zones immediately above and below the center can be compared to the center to optimize the vertical parabolic correction. The optimization is performed as follows. The peaks of the left and right zones are compared with the center and the horizontal parabolic correction is varied on a trial and error basis until these areas are as close as possible in peak voltage to the center. That is, when successive comparisons fail to converge any further. In a similar manner the top and bottom zones are compared with the center and the vertical parabolic correction is varied on a trial and error basis to bring the top and bottom areas as close as possible in peak voltage to the center. That is, when successive comparisons fail to converge any further. If the center is not available because of a subject in the center of the raster, the four middle areas are averaged to approximate a center.

9. After all corrections have been applied, all peaks are averaged to determine the overall gain of the background. After all corrections have been applied, all peaks are averaged to determine the overall level of the $E_c$ and consequently to determine the level of the background gain control through multiplier 81e. The gain of the output multiplier 35 is typically set such that a one volt peak waveform on input Y representing a finally processed $E_c$ causes the background video to be set for unity gain at average peak $E_c$. A white and black clip is set typically at one volt and ground respectively so that very small peaks of $E_c$ which are greater than the average are disregarded. The microprocessor increments or decrements the value of the background gain control as needed to set the average peak Ec after multiplier 31 but before clip 33 at typically one volt. The gain of the output multiplier is known so that the background gain control can be set such that the peak of the resulting Ec is normalized :o the white clip value of white and black clip 33. For example, if the final multiplier has a gain such that one volt on the Y input delivers a video output equal to the input, then the white clip is set to one volt and the background gain control is adjusted such that the true peak $E_c$ is right at the clip point.

At the conclusion of this sequence, the microprocessor controlled adjustment process may be optimized by manual adjustments using a remote control 85 and serial control line 87. The operator is an integral part of this procedure because the scene may require a faint shadow cast by a subject on the left or right side of the picture and this constraint would make the automated adjustment technology unusable. If, however, some "bare stage" information can be recorded on the tape during production, the automated system can function before the subject is in place. The microprocessor could also "watch" the entire recorded scene continuously updating stored peaks with newly observed higher peaks, assuming that the subject is moving about the stage area. The adjustments could then be based on highest peak values for a whole scene thereby minimizing error. Since the peak data are digitized values, the control approximation could be done in one pass in this case.

I claim:

1. An apparatus for applying correction to a key signal used to modulate a background video signal to be combined with a foreground video signal, said foreground video signal having a vertical drive component and a horizontal sync component, to produce a composite video signal, said correction for compensating errors in the key signal due to at least one of i) non-uniform lighting of a backing used in creating the foreground video signal, and ii) lens vignetting in the camera used to create the foreground video signal, said apparatus comprising:

a) first means (15) for generating a variable video field synchronized ramp function signal based upon said vertical drive component;

b) second means (17) for generating a variable video field synchronized parabolic function signal based upon said vertical drive component;

c) third means (11) for generating a variable line synchronized ramp function signal based upon said horizontal sync component;

d) fourth means (13) for generating a variable line synchronized parabolic function signal based upon said horizontal sync component;

e) fifth means (81e) for generating a variable reference function signal based upon a direct current reference voltage;

f) summing means (29) for summing the function signals generated by said first, second, third, fourth and fifth means;

g) first multiplier means (31) coupled to said summing means for modulating said key signal based upon said summed signals;

h) clip means (33) coupled to said first multiplier means to clip the modulated key signal to a level which is at least 0 volts and less than the video level of the background video signal;

i) second multiplier means (35) coupled to said clip means for modulating said background video signal based upon said modulated and clipped key signal.

2. The apparatus defined by claim 1 wherein said function signals generated by said first, second, third, and fourth means are each varied by a potentiometer coupled to each of said means, which potentiometers each produce a signal which varies continuously from the function signal generated by each of said first, second, third, and fourth means and the inverse of each of said signals, and said function signal generated by said fifth means is varied by a potentiometer coupled to said reference voltage.

3. The apparatus defined by claim 1 wherein said function signals generated by said first, second, third, fourth and fifth means are each varied by first, second, third, fourth and fifth multipliers respectively coupled to each of said first, second, third, fourth and fifth means, said apparatus further comprising means (51, 83) for generating multiplier control signals, which multipliers multiply each of said generated function signals by a number from 0 to 1 based upon said multiplier control signals, said multiplier control signals being a vertical ramp control, a horizontal ramp control, a vertical parabola control, a horizontal parabola control and a background gain control.

4. The apparatus defined by claim 3 wherein said multiplier control signal generating means comprises:

a) means (57) coupled to said first multiplier means for detecting peak values of said modulated key signal for each of at least first, second, third, fourth, fifth and sixth segments of a video frame formed by said foreground video signal, said first segment representing one side portion of said video frame, said second segment representing a second side portion of said video frame, said third segment representing a top portion of said video frame, said fourth segment representing a bottom portion of said video frame, said fifth segment representing a center portion of said video frame and said sixth segment representing first, second, third and fourth corner portions of said video frame;

b) storage means (61) coupled to said detecting means for storing said detected peak values;

d) means for calculating:

i) a first average of said detected peak values for said first segment, a second average of said detected peak values for said second segment and the difference between said first average and said second average;

ii) a third average of said detected peak values for said third segment, a fourth average of said detected peak values for said fourth segment and the difference between said third average and said fourth average;

iii) a fifth average of said detected peak values for said fifth segment, a sixth average of said detected peak values for said sixth segment and the difference between said fifth average and said sixth average;

iv) said horizontal ramp control signal based upon said first and second average difference;

v) said vertical ramp control signal based upon said third and fourth average difference;

vi) said horizontal and vertical parabola control signals based upon a predetermined optimization utilizing said first through sixth averages;

vii) said background gain control signal based upon a seventh average which is an average of said first through sixth averages, said seventh average being used to determine said direct current reference voltage applied to said fifth means.

5. The apparatus defined by claim 4 wherein said predetermined optimization is performed by said calculating means by:

i) comparing said first average and said second average to said fifth average and adjusting said horizontal parabola control signal until said first and fifth averages and said second and fifth averages substantially cease converging; and ii) comparing said third average and said fourth average to said fifth average and adjusting said vertical parabola control signal until said third and fifth averages and said fourth and fifth averages substantially cease converging.

6. A method for applying correction to a key signal used to modulate a background video signal to be combined with a foreground video signal, said foreground video signal having a vertical drive component and a horizontal sync component, to produce a composite video signal, said correction for compensating errors in the key signal due to at least one of i) non-uniform lighting of a backing used in creating the foreground video signal, and ii) lens vignetting in the camera used to create the foreground video signal, said method comprising the steps of:

a) generating a variable video field synchronized ramp function signal based upon said vertical drive component;

b) generating a variable video field synchronized parabolic function signal based upon said vertical drive component;

c) generating a variable line synchronized ramp function signal based upon said horizontal sync component;

d) generating a variable line synchronized parabolic function signal based upon said horizontal sync component;

e) generating a variable reference function signal based upon a direct current reference voltage;

f) summing the function signals generated by said a) through e) method steps;

g) modulating said key signal based upon said summed signals;

h) clipping the modulated key signal to a level which is at least 0 volts and less than the video level of the background video signal;

i) modulating said background video signal based upon said modulated and clipped key signal.

7. The method defined by claim 6 wherein said function signals generated by said a) through d) method steps are each varied by a potentiometer, which potentiometers each produce a signal which varies continuously from the function signal generated by each of said a) through d) method steps and the inverse of each of said signals, and said function signal generated by said e) method step is varied by a potentiometer coupled to said reference voltage.

8. The method defined by claim 6 wherein said function signals generated by said a) through e) method steps are each varied by first, second, third, fourth and fifth multipliers, said method further comprising the step of generating multiplier control signals, which multipliers multiply each of said generated function signals by a number from 0 to 1 based upon said multiplier control signals, said multiplier control signals being a vertical ramp control, a horizontal ramp control, a vertical parabola control, a horizontal parabola control and a background gain control.

9. The method defined by claim 8 wherein said multiplier control signal generating step comprises the steps of:

a) detecting peak values of said modulated key signal for each of at least first, second, third, fourth, fifth and sixth segments of a video frame formed by said foreground video signal, said first segment representing one side portion of said video frame, said second segment representing a second side portion of said video frame, said third segment representing a top portion of said video frame, said fourth segment representing a bottom portion of said video frame, said fifth segment representing a center portion of said video frame and said sixth segment representing first, second, third and fourth corner portions of said video frame;

b) storing said detected peak values;

d) calculating:

i) a first average of said detected peak values for said first segment, a second average of said detected peak values for said second segment and the difference between said first average and said second average;

ii) a third average of said detected peak values for said third segment, a fourth average of said detected peak values for said fourth segment and the difference between said third average and said fourth average;

iii) a fifth average of said detected peak values for said fifth segment, a sixth average of said detected peak values for said sixth segment and the difference between said fifth average and said sixth average;

iv) said horizontal ramp control signal based upon said first and second average difference;

v) said vertical ramp control signal based upon said third and fourth average difference;

vi) said horizontal and vertical parabola control signals based upon a predetermined optimization utilizing said first through sixth averages;

vii) said background gain control signal based upon a seventh average which is an average of said first through sixth averages, said seventh average being used to determine said direct current reference voltage applied during said method step e).

10. The method defined by claim 9 wherein said predetermined optimization is performed by the steps of:
   i) comparing said first average and said second average to said fifth average and adjusting said horizontal parabola control signal until said first and fifth averages and said second and fifth averages substantially cease converging; and
   ii) comparing said third average and said fourth average to said fifth average and adjusting said vertical parabola control signal until said third and fifth averages and said fourth and fifth averages substantially cease converging.

* * * * *

UNITED STATES PATENT AND TRADEMARK OFFICE
CERTIFICATE OF CORRECTION

PATENT NO. : 5,202,762
DATED : April 13, 1993
INVENTOR(S) : Fellinger

It is certified that error appears in the above-identified patent and that said Letters Patent is hereby corrected as shown below:

In column 3 at line 6 change "tully" to -- fully --

Signed and Sealed this

Eighteenth Day of April, 1995

Attest:

BRUCE LEHMAN

Attesting Officer

Commissioner of Patents and Trademarks